United States Patent Office 3,035,388
Patented May 22, 1962

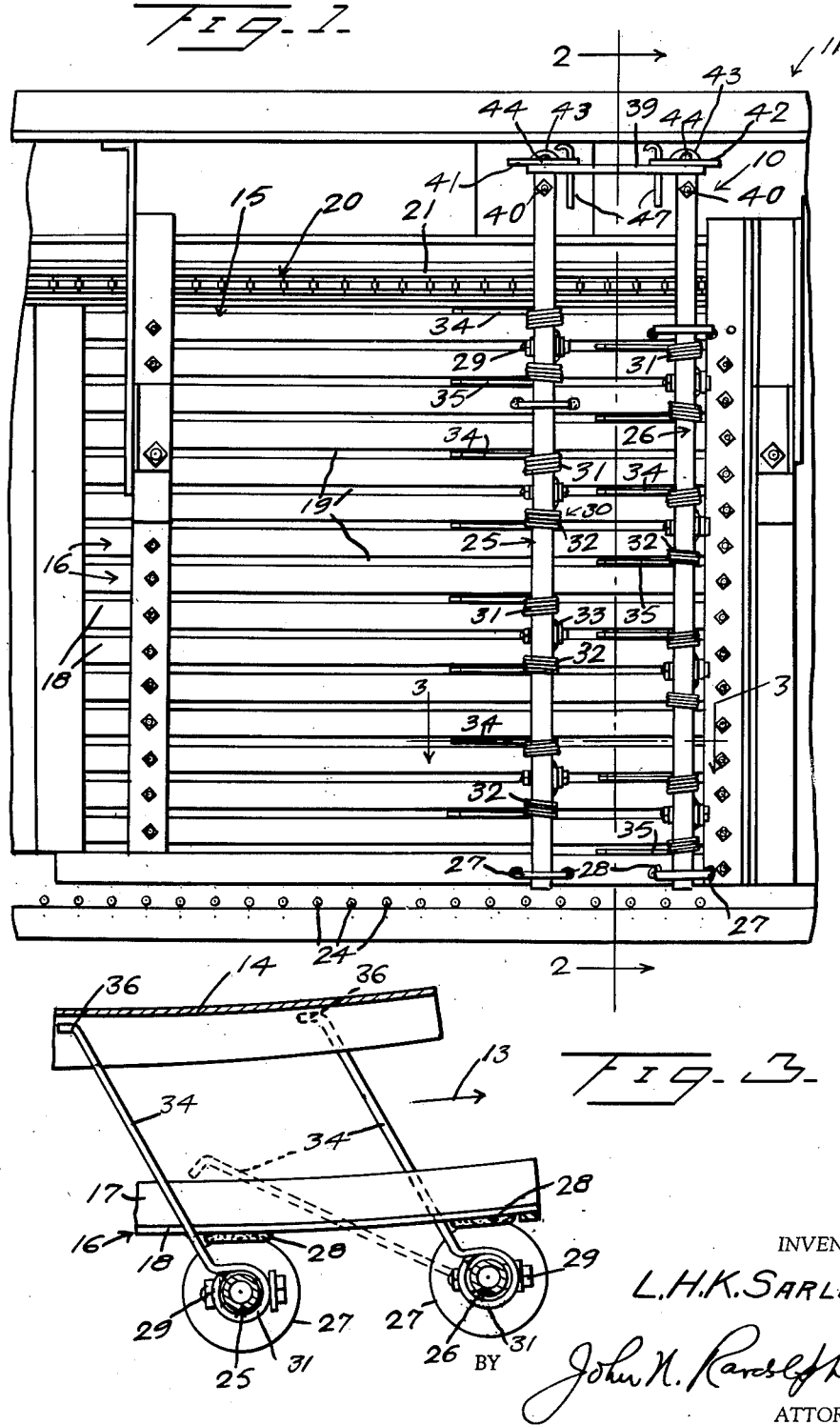

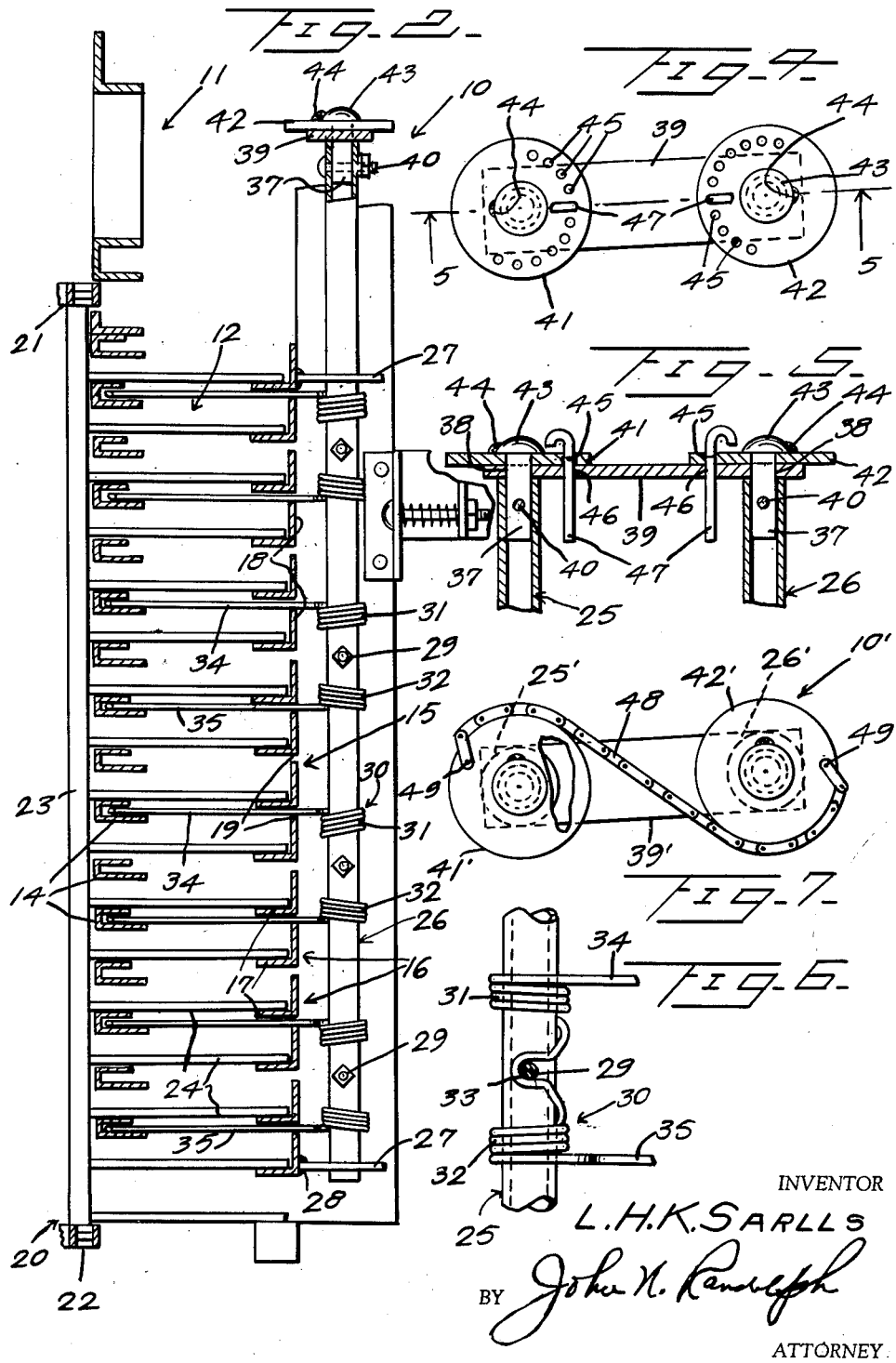

3,035,388
STALK CROWDER ATTACHMENT FOR
COTTON PICKING MACHINE
Lawrence H. K. Sarlls, Rte. 4, Box 27A, Victoria, Tex.
Filed Oct. 21, 1960, Ser. No. 64,043
7 Claims. (Cl. 56—42)

This invention relates to an attachment of simple construction capable of being readily applied to a stalk crowder of a conventional cotton picking machine for applying a more uniform and yielding crowding effect, than is presently accomplished, to the cotton plants passing through the plant passageway of the machine.

More particularly, it is an aim of the present invention to provide an attachment capable of functioning effectively for shattering the burrs, due to spring loaded elements of the attachment being swung to retracted positions by contact with the plant branches and thereafter released to swing forcibly into contact with the open bolls for breaking away the burrs to leave the seed cotton in a loose condition to be readily wound about spindles of the machine.

Still a further object of the invention is to provide an attachment wherein the spring loaded elements will fluff the seed cotton, as the burrs are shattered thereby, enabling the spindles to more readily grasp the fluffed fibers of the cotton, and for causing the cotton to wrap more readily around the spindles.

Still a further object of the invention is to provide a crowder attachment which may be readily adjusted for varying the tension on the spring loaded elements thereof for thereby more effectively varying the striking force exerted by said elements on the cotton bolls.

Various other objects and advantages of the invention will hereinafter become more fully apparent from the following description of the drawings, illustrating a presently preferred embodiment thereof, and wherein:

FIGURE 1 is a fragmentary side elevational view looking toward a portion of the right-hand side of a conventional cotton picking machine, and showing the attachment, constituting the present invention, applied thereto;

FIGURE 2 is an enlarged fragmentary transverse sectional view, taken substantially along a plane as indicated by the line 2—2 of FIGURE 1;

FIGURE 3 is an enlarged fragmentary horizontal sectional view, taken substantially along a plane as indicated by the line 3—3 of FIGURE 1;

FIGURE 4 is a top plan view of the attachment, on an enlarged scale;

FIGURE 5 is a fragmentary vertical sectional view, taken substantially along a plane as indicated by the line 5—5 of FIGURE 4;

FIGURE 6 is a fragmentary vertical sectional view, on an enlarged scale, of a portion of the attachment, and FIGURE 7 is a top plan view, partly broken away, similar to FIGURE 4, showing a slightly modified form of the attachment.

Referring more specifically to the drawings, for the purpose of illustrating the application and use of the stalk crowding attachment, designated generally 10 and comprising the invention, a portion of the right-hand side of a conventional cotton picking machine has been illustrated in FIGURES 1, 2 and 3, said part of the machine being designated generally 11 and including a part of the picking section 12 of the stalk passageway. The stalk passageway has open ends, as is conventional, through which the cotton stalks pass from right to left, as seen in FIGURE 3, when the machine is moving forwardly along a row of cotton plants, in the direction as indicated by the arrow 13. The inner side of the passageway picking section 12 is defined by longitudinally extending vertically spaced stalk guards 14, each of which is of channel shaped cross section and disposed to open into the passageway and toward the outer side thereof which is defined by a stalk crowder wall or door, designated generally 15. The stalk crowder door or wall 15 is composed of longitudinally extending vertically spaced bars 16 each of which is of angular cross section, as seen in FIGURE 2. Each bar 16 includes an inwardly extending bottom flange 17 and an upwardly extending outer vertical flange 18. The spacing between the bars 16 form longitudinally extending slots 19.

A portion of the conventional endless conveyor, designated generally 20, of the machine is shown in FIGURES 1 and 2 and includes endless top and bottom chains 21 and 22, respectively, and vertical slats 23 which extend between and are secured to the chains 21 and 22. The endless conveyor includes sprocket wheels, not shown, over which the chains 21 and 22 are trained and by which said chains are driven. The slats 23 move rearwardly of the machine along inner sides of the stalk guards 14, so that said stalk guards are disposed between the slats and the stalk passageway picking section 12. Each slat 23 carries vertically spaced cotton picking spindles 24 which extend laterally therefrom between the stalk guards 14 and across the passageway section 12 and which have outer free ends which travel along the upper sides of the horizontal flanges 17. The endless conveyor 20 is driven in a direction so that the spindles 24 travel rearwardly of the machine along the passageway section 12 or from right to left of FIGURE 3. The parts of the cotton picking machine, as heretofore briefly described and as illustrated in the drawings, is of the type as shown in U.S. patents, Nos. 2,607,178 and 2,665,537, granted August 19, 1952, and January 12, 1954, respectively, to John D. Rust.

The crowder attachment 10, as herein disclosed, includes two shafts or supporting members 25 and 26 which are mounted vertically on the outer side of the crowder wall or door 15. Each of said shafts is journaled in two vertically spaced bearings 27. The bearings 27 are secured, as by welding, as seen at 28, to the vertical flanges 18 of certain of the bars 16 and extend outwardly therefrom.

The shafts 25 and 26 are preferably hollow and are each provided with a plurality of anchoring fastenings 29 which extend diametrically therethrough. The anchoring fastenings 29 are disposed between the bearings 27 and each constitutes a nut and bolt fastening. The fastenings 29 of the shaft 25 are staggered relative to the fastenings 29 of the shaft 26, as illustrated in FIGURE 1. Each fastening 29 anchors a strand 30 of spring wire to the shaft thereof. Each strand 30 includes two coiled portions 31 and 32 which are loosely wound about the shaft, above and beneath the fastening 29, and an intermediate loop portion 33 which is disposed between the coils 31 and 32 and which engages and is anchored to the fastening 29. The two terminals of the strand 30 extend from the remote ends of the coils 31 and 32, as best seen in FIGURE 6, and form spring fingers 34 and 35, respectively. The coils 31 and 32 are supported by the fastening 29 so that the remote ends thereof and the fingers 34 and 35 substantially align with two of the slots 19. The spring fingers 34 and 35 are substantially straight and extend through said two slots 19 across the picking section 12 and have rearwardly turned free ends 36, as seen in FIGURE 3, which normally engage in two of the stalk guards 14. The fingers 34 and 35 of each strand 30 are spaced apart so as to straddle the slot 19, located between the slots through which said fingers extend. The fastenings 29 and the strands 30 of the two shafts 25 and 26 are staggered relative to one another, as seen in FIGURE 1, so that the spring fingers 34 and 35 of the shaft 25 engage the slots 19 straddled by the spring fingers 34 and 35 of the shaft 26, and conversely. This likewise applies to the engagement of the spring finger ends 36 with the stalk guards 14, the spring finger ends 36 of the shaft 25 engaging alternate stalk guards 14 and those straddled by the finger ends 36 of the shaft 26, and conversely. Since the spring fingers 34 and 35 are disposed in the plane of the stalk guards 14, as seen in FIGURE 2, and as the spindles 24 extend between said stalk guards, the spindles 24 are staggered relative to the spring fingers of both shafts and travel rearwardly therebetween.

As best seen in FIGURE 5, headed pins 37 extend loosely through openings 38 in a bar 39 and into the upper ends of the shafts 25 and 26, to which said pins are anchored by fastenings 40. Thus, the pins 37 and shafts 25 and 26 are capable of rotating relative to the bar 39. Disks 41 and 42 are mounted on the pins 37 of the shafts 25 and 26, respectively, between the heads 43 of said pins and the bar 39 and said disks are secured to the heads 43, as by welding, as seen at 44, so that the disk 41 can rotate only with the shaft 25 and the disk 42 can rotate only with the shaft 26. As seen in FIGURE 4, each disk 41 and 42 has a series of arcuately spaced openings 45 each of which is spaced the same distance from the center of said disk. The bar 39 has openings 46, one of which is disposed to selectively align with the openings 45 of the disk 41, when said disk is revolved with the shaft 25, and the other of which similarly aligns selectively with the openings 45 of the disc 42 by rotation of said disk 42 and the shaft 26. Pins 47 are selectively engageable through the aligned openings 45 and 46 for securing the shafts 25 and 26 in different rotatably adjusted positions for varying the angles at which the fingers 34 and 35 will project from the shafts 25 and 26 through the stalk crowder 15. As seen in FIGURE 3, said spring fingers normally are inclined rearwardly across the passage section 12 from the stalk crowder 15 toward the stalk guards 14. By rotatably adjusting the shafts 25 and 26 clockwise, as seen in FIGURE 3, the spring fingers 34 and 35 will be swung forwardly for increasing the amount of force required to spring the fingers away from the stalk guards 14 and to retracted positions, as seen in dotted lines in FIGURE 3, with the terminals 36 thereof located adjacent the crowder 15 and in positions not obstructing the passage 12.

The stalks and branches, not shown, of cotton plants pass rearwardly or from right to left as seen in FIGURE 3, through the passage 12 as the machine travels in the opposite direction, as indicated by the arrow 13, along a row of cotton plants. The spindles 24 move in the same direction, within the passage 12, as the cotton plants. The stalks and branches of the plants strike the spring fingers 34 and 35 to force said fingers to yield rearwardly or counterclockwise, as previously described, to enable the stalks and branches to pass the fingers when the fingers are located in their dotted line positions. After the plant stalk or branch passes out of engagement with the finger 34 or 35, said finger will spring forcibly in a clockwise direction back across the passage 12 toward the stalk guard 14 normally engaged thereby. During such movement, the fingers 34 and 35 will forcibly strike the cotton bolls, not shown, so as to shatter the burrs thereof, leaving the loose cotton of said open cotton bolls with the fibers of the cotton fluffed so as to be readily grasped by hand and wound on the picking spindles 24 and thereby more readily separated from the cotton plants.

It will be obvious that the force with which the fingers 34 and 35 will spring forwardly across the passage portion 12 can be varied by rotatably adjusting the shafts 25 and 26 with the pins 47 removed, and thereafter locking the shafts in desired adjusted positions by applying the pins through aligned openings 45 and 46. By adjusting the shafts 25 and 26 counterclockwise, as seen in FIGURE 3, the spring fingers will be tensioned to a lesser extent when swung away from the stalk guards 14 and will therefore strike the open cotton bolls with less force when released to spring back toward the stalk guards 14. It will also be apparent that the spring fingers of the two shafts 25 and 26 are adjusted independently and that the yielding and springing movement of each finger of each shaft is independent of and unaffected by each of the other fingers.

FIGURE 7 illustrates a slight modification of the attachment and wherein a yielding movement of the spring fingers of one shaft results in an increased tension being applied to the fingers of the other shaft. The attachment 10′, as shown in FIGURE 7, differs from the attachment 10 only in that the disks 41′ and 42′ are not provided with the openings 45 and are not anchored to the bar 39′. The anchoring pins 47 are omitted and the openings 46 may also be omitted. In lieu of the omitted parts, a chain or other nonelastic flexible element 48 is fastened at its ends as seen at 49 to the two disks 41′ and 42′ and is partially wound in opposite directions about portions of the peripheries of said two disks. Consequently, if the spring fingers of the shaft 26′ are forced to yield causing said shaft and its disk 42′ to turn counterclockwise to decrease the tension on the spring fingers thereof, not shown, the shaft 25′ and its disk 41′ will be turned to the same extent in a clockwise direction, due to the connection of the disks 41′ and 42′ by the flexible element 48, for swinging the spring fingers of the shaft 25′ forwardly of the passage portion 12 so that the tension on said fingers will be increased proportionately to a decrease in tension on the fingers of the shaft 26′. With the modification of FIGURE 7, too great a tensioning of the spring fingers can be avoided to prevent the open cotton bolls from being struck too forcibly and to avoid damage, which might otherwise occur, to green and unopened cotton bolls.

Various other modifications and changes are contemplated and may be resorted to without departing from the function or scope of the invention as hereinafter defined by the appended claims.

I claim as my invention:

1. In combination with a cotton picking machine including endlessly driven picking spindles, and a stack crowder wall defining the outer side of a picking passage along which the picking spindles travel in a rearward direction, said stalk crowder wall having vertically spaced slots; a crowder attachment comprising a pair of shafts, bearings extending outwardly from said stalk crowder wall for supporting and journaling said shafts in substantially upright positions and crosswise of said slots, spring fingers extending from each of the shafts through said slots and across the picking passage, each spring finger being yieldable relative to the shaft thereof from said normal passage obstructing position to a non-obstructing position relative to said passage, and means associated with said shafts and resisting rotation of the shafts in directions to swing said fingers to said non-obstructing positions.

2. An attachment as in claim 1, said means including a bar swivelly connected to each of said shafts, disks fixed to said shafts and turnably engaging said bar, said bar having openings, each disk having a series of openings selectively aligning with an opening of the bar when the disk is revolved with the shaft thereof, and a pin for each disk selectively engageable with an opening thereof and one of said bar openings for selectively securing each shaft in a desired position of rotation for positioning the spring fingers of said shaft at a desired angle to the crowder and passage such that each spring finger will be tensioned to a desired extent when swung to a non-obstructing position relative to said passage.

3. An attachment as in claim 1, said means including a nonelastic flexible element, and members fixed to said shafts and to which the ends of said flexible element are anchored with end portions of the flexible element wound in opposite directions on said members whereby said shafts will be rotated in opposite directions by torque applied to either shaft for rotating said shaft in a direction to exert a pull on said flexible element.

4. An attachment as in claim 1, said spring fingers of each shaft being normally disposed coplanar, said spring fingers of the two shafts being staggered relative to one another and being so spaced that the spring fingers of the two shafts extend through different slots of the stalk crowder and with each slot engaged only by a single spring finger.

5. In combination with a cotton picking machine including endlessly driven picking spindles, a picking passage extending longitudinally of the machine along which the picking spindles travel in a rearward direction, and a stalk crowder wall defining an outer side of the picking passage and having vertically spaced slots; a crowder attachment comprising a supporting member, means connected to the crowder wall and mounting the supporting member on the outer side thereof and substantially crosswise of said slots, a plurality of longitudinally spaced fingers mounted on said supporting member and projecting laterally therefrom through said slots and across the picking passage in the normal passage obstructing positions of said spring fingers, said spring fingers being yieldably displaceable relative to the supporting member to non-obstructing positions relative to the picking passage.

6. A crowder attachment as in claim 5, said means rotatably mounting said supporting member and the spring fingers carried thereby for varying the angle of the spring fingers relative to planes of said passage and the crowder wall for varying the amount of pressure required to move said fingers to non-obstructing positions and the tension on the fingers when disposed in non-obstructing positions, and means for releasably retaining said supporting member in different rotatably adjusted positions.

7. A crowder attachment as in claim 5, said spring fingers forming the ends of resilient wire strands, each strand including an intermediate portion, means anchoring the intermediate portions of the strands to said supporting member, and each strand including coiled portions disposed between the intermediate portion thereof and the spring fingers formed by said strand, said coiled portions loosely embracing the supporting member.

References Cited in the file of this patent

UNITED STATES PATENTS

| | | |
|---|---|---|
| 2,657,514 | Rust | Nov. 3, 1953 |
| 2,790,538 | Collins et al. | Apr. 30, 1957 |
| 2,830,427 | Odom | Apr. 15, 1958 |